J & I. M. Poffenberger.
Corn Harvester.
N° 91964
Patented Jun. 29, 1869

Witnesses
E. Weiff
Wm A Morgan

Inventors.
John Poffenberger
Ira M. Poffenberger
pr. Munn
Attorneys.

UNITED STATES PATENT OFFICE.

JOHN POFFENBERGER AND IRA M. POFFENBERGER, OF URBANA, OHIO.

IMPROVEMENT IN CORN-HARVESTERS.

Specification forming part of Letters Patent No. 91,964, dated June 29, 1869.

*To all whom it may concern:*

Be it known that we, JOHN POFFENBERGER and IRA M. POFFENBERGER, of Urbana, in the county of Champaign and State of Ohio, have invented a new and Improved Corn, Cane, and Hemp Harvester; and we do hereby declare that the following is a full, clear, and exact description thereof, which will enable others skilled in the art to make and use the same, reference being had to the accompanying drawings, forming part of this specification, in which—

Figure 1:
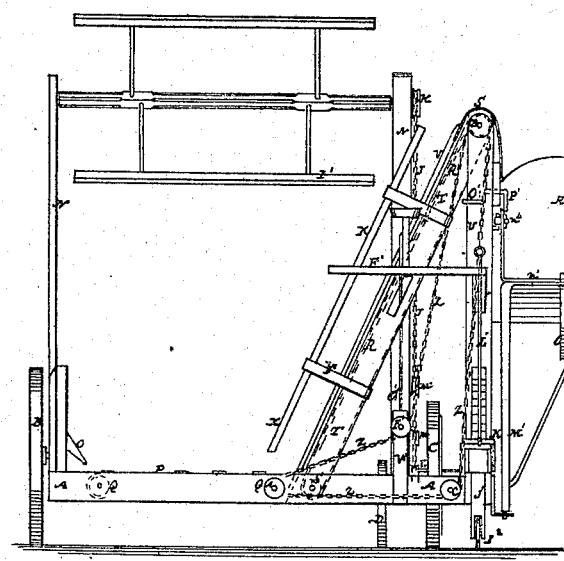
Figure 2:
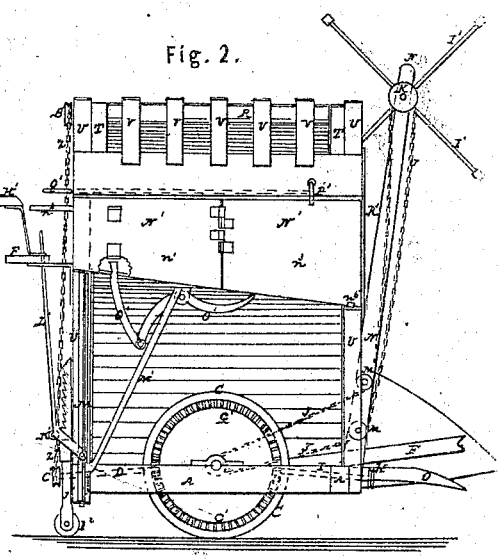
Figure 3:
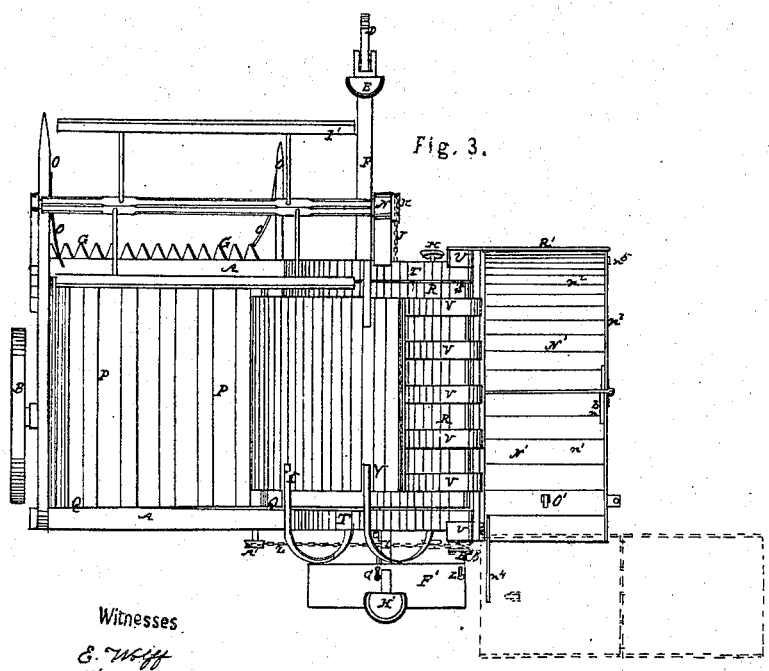

Figure 1 is a rear view of our improved harvester. Fig. 2 is a side view of the same. Fig. 3 is a top or plan view of the same.

Similar letters of reference indicate corresponding parts.

Our invention has for its object to furnish a convenient and effective machine for cutting and shocking corn, cane, and hemp, which shall be so constructed and arranged as to do its work thoroughly and well; and it consists in the construction and combination of the various parts, as hereinafter more fully described.

A represents the horizontal frame of the machine, which is supported upon the wheels B and C and the guide-wheel D, which supports the driver's seat E, and which is pivoted to the frame F, to which the tongue is attached. (Tongue not shown in the drawings.)

G represents the cutters, which are operated by the pulley H, rigidly attached to the shaft I, which revolves in bearings in the frame A, and to the other end of which should be attached a gear-wheel meshing into the gear-wheel $c'$, attached to or formed upon the side of the wheel C, as shown in Fig. 2.

I' is the reel, by which the corn, cane, or hemp to be cut is swept back against the cutter G and caused to fall upon the platform of the machine. The reel I' is driven from the wheel C by the chain or belt J, which passes around the pulley K, attached to the projecting journal of the reel-shaft, around the pulley L, formed upon or attached to the hub of the wheel C, and around the guide-pulleys M, attached to the frame or posts N, by which the reel I' is supported.

O are fingers or arms projecting in front of the frame A, for the purpose of raising the inclined stalks and bringing the stalks into proper position to be operated upon by the cutters G.

P is an endless apron, which forms the platform of the machine, and which passes around the rollers or pulleys Q, which are pivoted to the frame A. The endless apron P should be provided with cross-slats to assist in carrying the corn, cane, or hemp across the machine.

R is an endless apron which passes around the rollers S, pivoted to the inclined frame T, which is attached to and supported by the frame A and vertical frame U.

The endless apron R should have cross slats or bars attached to it, said slats being provided with spikes or fingers projecting through the spaces between the bars V, to carry the corn, cane, or hemp up the inclined frame T, so as to fall into the box N'.

X is a guard, which is supported in an inclined position in front of the inclined bars V by the springs Y in such a position that the stalks of corn, cane, or hemp may pass beneath its lower edge, and so as to keep the said stalks from falling back upon the platform P while being carried up the inclined frame T. The endless aprons P and R are operated by the chain Z, which passes around the pulley A', attached to the journal of one of the rollers Q, around the pulley B', attached to the journal of one of the rollers S, and around the pulley C', attached to the shaft D', which revolves in the frame A, and to the inner end of which should be attached a gear-wheel meshing into the gear-wheel $c'$, formed upon or attached to the side of the wheel C. The chain or belt Z also passes around the movable pulley E', pivoted to a short post or standard, W, attached to the frame A, and which is connected with the platform F' by a rod, G', so that the operator from his seat H' upon the said platform may adjust the pulley E' to tighten or loosen the chain or belt Z, according as he desires that the endless aprons P and R should be operated or not.

$I^2$ is a wheel pivoted to the lower end of the standard or movable post J', which slides up and down in a keeper or guide attached to the vertical frame U, and which is adjustably supported in place by the pawl K', which is operated to fasten or release the said post by the rod L', which passes up through the platform F' into such a position that it can be conveniently operated by the attendant from his seat H'.

The wheel $I^2$ is intended to support the frame of the machine when the receiving-box is operated to form the shock.

M' is a crane, the vertical shaft of which is pivoted to the frame of the machine, and to the horizontal arm of which is attached the box N'. The box N' is open at the top and at both ends, and is made in three parts, $n'$, $n^2$, and $n^3$. The part $n'$ is rigidly attached to the horizontal arm of the crane M', and is provided with a lever, $n^4$, by means of which the said box N' and crane M' may be swung out and in by the operator from his seat H'.

The bottom of the part $n^2$ is hinged to the bottom of the part $n'$, as shown in Fig. 3, so that the said part $n^2$ may be dropped to allow the shock of corn, cane, or hemp to be dropped in a vertical position and upon its butt-end. The part $n^2$ is raised and supported by the jointed lever O', which is pivoted to the stationary part $n'$ of the box N. The forward end of the lever O' rests against the bottom of the part $n^2$ of said box N', so as to raise and support said part, and its rear or jointed end passes up through a hole in the bottom of the said part $n'$, and is provided with a notch or catch to catch upon the said bottom and hold the part $n^2$ in a horizontal position. The part $n^3$ is hinged to the vertical side of the part $n'$ in the manner of a door, is held in position when closed by the catch $n^5$, attached to the part $n^2$, and is operated or opened and closed by the lever $n^6$, as shown in Fig. 3. The box N' is secured in place, when swung into position to receive the stalks of corn, cane, or hemp, by the catch P', which is operated to secure or release the said box by the rod Q', which extends back into such a position that it may be conveniently reached and operated by the attendant from his seat H'.

R' is a board or plate, which is rigidly attached to the vertical frame U in such a position as to close the forward end of the box N' when said box is swung into a position to receive the stalks of corn, cane, or hemp, and keep the butt-ends of said stalks even.

In using the machine, as it is drawn forward the cut stalks fall upon the endless apron P, by which they are carried to the endless apron R, which receives them and carries them up through the space between the guard-boards X and inclined bars V, said stalks sliding upon the said bars V as they are carried up by the said endless apron R, and falling from said bars V and endless apron R into the box N' When a sufficient amount of stalks have been received to form a shock the machine is stopped, the catch P' unfastened, and the box N' swung into a position at right angles with its former position, as shown in red in Fig. 3. The jointed lock and catch-lever O' is then unfastened, allowing the part $n^2$ of the box N to drop, the shock coming to the ground butt-end first and in a vertical position. The shock of stalks should be bound or tied before releasing the part $n^2$ of the box N. For convenience in doing this a spool of cord or twine should be pivoted to ears formed upon or attached to the outer side of the part $n'$ of the box N', as shown in Figs. 1, 2, and 3. As soon as the shock has been dropped the tightening-pulley E' should be operated to slacken the chain Z and the machine moved forward until the box N' can be raised without interfering with the shock just dropped from the machine. The box N' is then raised, swung back, and fastened in its place. The chain Z is again tightened, and the machine is ready for forming another shock.

Having thus described our invention, we claim as new and desire to secure by Letters Patent—

1. The inclined board X, when supported parallel to the endless apron R and inclined bars V by means of the curved springs Y, as herein described, for the purpose specified.

2. The wheel $I^2$, adjusted upon the lower end of the frame U by means of the toothed post J', pawl K', and rod L', all arranged as described, for the purpose of steadying the machine when the filled box N' is operated, as herein shown and described.

3. The receiving-box N', constructed, arranged, and operating in combination with the crane M', jointed catch-lever O', stationary end board or plate, R', and endless apron R, substantially as herein shown and described, and for the purpose set forth.

4. The combination and arrangement of the wheel E', sliding post or standard W, and rod G' with each other and with the platform F', substantially as herein shown and described, and for the purpose set forth.

JOHN POFFENBERGER.
IRA M. POFFENBERGER.

Witnesses:
MICHAEL GALLIGHER,
WM. C. WHITMER.